(12) United States Patent
Sloane et al.

(10) Patent No.: US 12,107,853 B2
(45) Date of Patent: Oct. 1, 2024

(54) SYSTEM AND METHOD FOR INTELLIGENT AUTHENTICATION VIA OBJECT MOVEMENT RECOGNITION

(71) Applicant: BANK OF AMERICA CORPORATION, Charlotte, NC (US)

(72) Inventors: Brandon Sloane, Indian Land, SC (US); Lauren Jenae Alibey, Charlotte, NC (US); Sophie Morgan Danielpour, Durham, NC (US); Jinyoung Nathan Kim, Charlotte, NC (US); James Thomas MacAulay, Erie, CO (US); Serge Alejandro Neri, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 294 days.

(21) Appl. No.: 17/725,920

(22) Filed: Apr. 21, 2022

(65) Prior Publication Data
US 2023/0344828 A1    Oct. 26, 2023

(51) Int. Cl.
*H04L 9/40*     (2022.01)
*G06V 40/20*    (2022.01)

(52) U.S. Cl.
CPC .......... *H04L 63/0861* (2013.01); *G06V 40/20* (2022.01); *H04L 63/10* (2013.01); *H04L 2463/082* (2013.01)

(58) Field of Classification Search
CPC ................. H04L 63/0861; H04L 63/10; H04L 2463/082; G06V 40/20
See application file for complete search history.

(56) References Cited

U.S. PATENT DOCUMENTS

| | | | |
|---|---|---|---|
| 8,457,367 | B1 | 6/2013 | Sipe et al. |
| 8,515,139 | B1 | 8/2013 | Nechyba et al. |
| 8,798,336 | B2 | 8/2014 | Nechyba et al. |
| 9,106,789 | B1 | 8/2015 | Shipman, Jr. et al. |
| 9,177,131 | B2 | 11/2015 | Zhang et al. |
| 9,313,200 | B2 | 4/2016 | Hoyos |
| 9,424,412 | B1 * | 8/2016 | Pender ................. H04W 12/06 |
| 9,432,632 | B2 | 8/2016 | Cheng et al. |
| 9,607,138 | B1 | 3/2017 | Baldwin et al. |
| 9,652,663 | B2 | 5/2017 | Lau et al. |
| 9,774,826 | B1 | 9/2017 | Hodge |
| 9,898,596 | B2 | 2/2018 | Lindemann |
| 10,305,895 | B2 | 5/2019 | Barry et al. |
| 10,339,362 | B2 | 7/2019 | Othman et al. |
| 10,691,939 | B2 | 6/2020 | Xue et al. |
| 11,068,741 | B2 | 7/2021 | Wang et al. |

(Continued)

*Primary Examiner* — Ayoub Alata
(74) *Attorney, Agent, or Firm* — Moore & Van Allen PLLC; Nicholas C. Russell

(57) ABSTRACT

The present invention is generally related to systems and methods for providing an improved authentication and verification system through the use of compiled user data and unique user action data collected by the system from a prompted movement analysis. The system may collect and analyze multiple instances of user actions using intelligent machine learning techniques in order to identify patterns unique to the user. The system may then use this information in conjunction with other known information in order to determine the veracity of attempted user authentication or authorization requests.

17 Claims, 5 Drawing Sheets

(56) References Cited

U.S. PATENT DOCUMENTS

| | | |
|---|---|---|
| 11,188,734 B2 | 11/2021 | Mather et al. |
| 11,330,012 B2 | 5/2022 | Turgeman |
| 2015/0186711 A1 | 7/2015 | Baldwin et al. |
| 2015/0294096 A1* | 10/2015 | Grigg .................... H04L 63/08 726/5 |
| 2016/0057138 A1 | 2/2016 | Hoyos et al. |
| 2018/0268674 A1 | 9/2018 | Siminoff |
| 2019/0251571 A1 | 8/2019 | O'Reilly et al. |
| 2020/0204541 A1* | 6/2020 | Nair ................... H04L 63/0853 |
| 2022/0374075 A1* | 11/2022 | Baum ................... H04N 23/69 |

\* cited by examiner

SYSTEM AND METHOD FOR INTELLIGENT AUTHENTICATION VIA OBJECT MOVEMENT RECOGNITION

FIELD OF THE INVENTION

The present invention is generally related to systems and methods for providing an improved authentication and verification system through the use of compiled user data and from multiple channels of input. Multiple devices may be utilized by the system in order to receive and process data to authenticate user identities and verify the validity of attempted account access or account activity.

BACKGROUND

Existing authentication and resource account validation systems and methods may be susceptible to false authorization in instances where users provide closely modeled or emulated data in order to mimic valid user verification of account activity. With the advent of more prevalent and accessible biometric analysis and authentication via mobile devices and monitoring systems, the use of biometrics and aggregate user pattern data for identity verification has become more economical and feasible. A need exists for improved systems and methods for detecting authentic data and discerning emulated or malfeasant data in order to confirm valid account activity with a high degree of certainty and confidence. This process can be improved through the use of intelligent gait and movement analysis in conjunction with the use of intelligent machine learning models trained to discern unique user action patterns.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Multi-factor authentication (MFA) is an increasingly important requirement in enterprise authentication implementations. However, existing MFA solutions are increasingly susceptable to vulnerabilities and opportunities for compromise. There is a need for a mechanism to authenticate users which is more robust, especially in terms of high-value resource account access and privileged user authentication. Embodiments of the present invention address these and/or other needs by providing an innovative system, method and computer program product for user authentication using compiled user data and unique user action data collected by the system from a prompted movement analysis. The system may collect and analyze multiple instances of user actions via a video recording mechanism, and analyze collected video and audio data using intelligent machine learning techniques in order to identify patterns unique to each user. The system may then use this information in conjunction with other known information in order to robustly determine the veracity of attempted user authentication or authorization request.

The system may include at least one processing device, and at least one non-transitory storage device may include computer-executable program code that, when executed by the at least one processing device, causes the at least one processing device to steps of: transmitting a prompt to a user device, wherein the prompt requests a user response to opt-in to an interactive authentication mechanism; receiving a selection to opt-in from the user device; transmitting instruction to the user device to initiate collection of imaging data via an image sensor of the user device; receiving a stream of imaging data from the user device over a network; and conducting an image analysis of a user or an object identified in the imaging data in order to determine one or more unique user action characteristics.

In some embodiments, the interactive authentication mechanism further comprises a multifactor authentication via object movement recognition.

In some embodiments, the selection to opt-in further comprises an authorization to access or activate the image sensor of the user device.

In some embodiments, the invention further comprises transmitting instructions to the user device to display an option to select one or more songs for playback during the stream of imaging data.

In some embodiments, the invention further comprises the use of infrared image sensing via the user device to render a three-dimensional map of one or more features of the user or a contour map of one or more objects.

In some embodiments, the invention further comprises providing API access to one or more third party systems, wherein the API access allows the one or more third party systems to authenticate the user via object movement recognition.

In some embodiments, the invention further comprises causing the user device to display a dashboard and reporting module, wherein the dashboard and reporting module indicates one or more metrics and volumes such as historical usage, authenticated transactions, or failed transactions.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
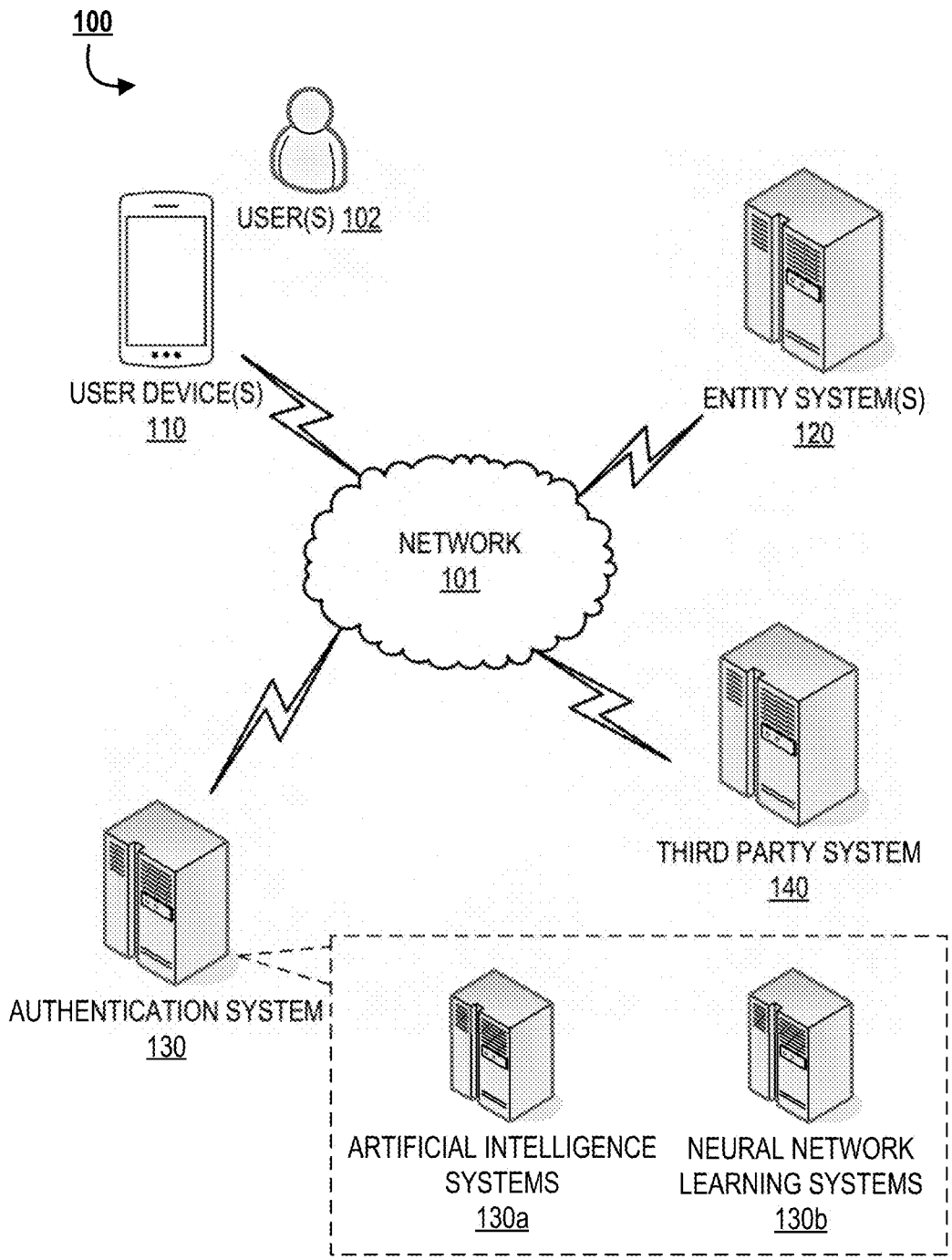
Figure 2:
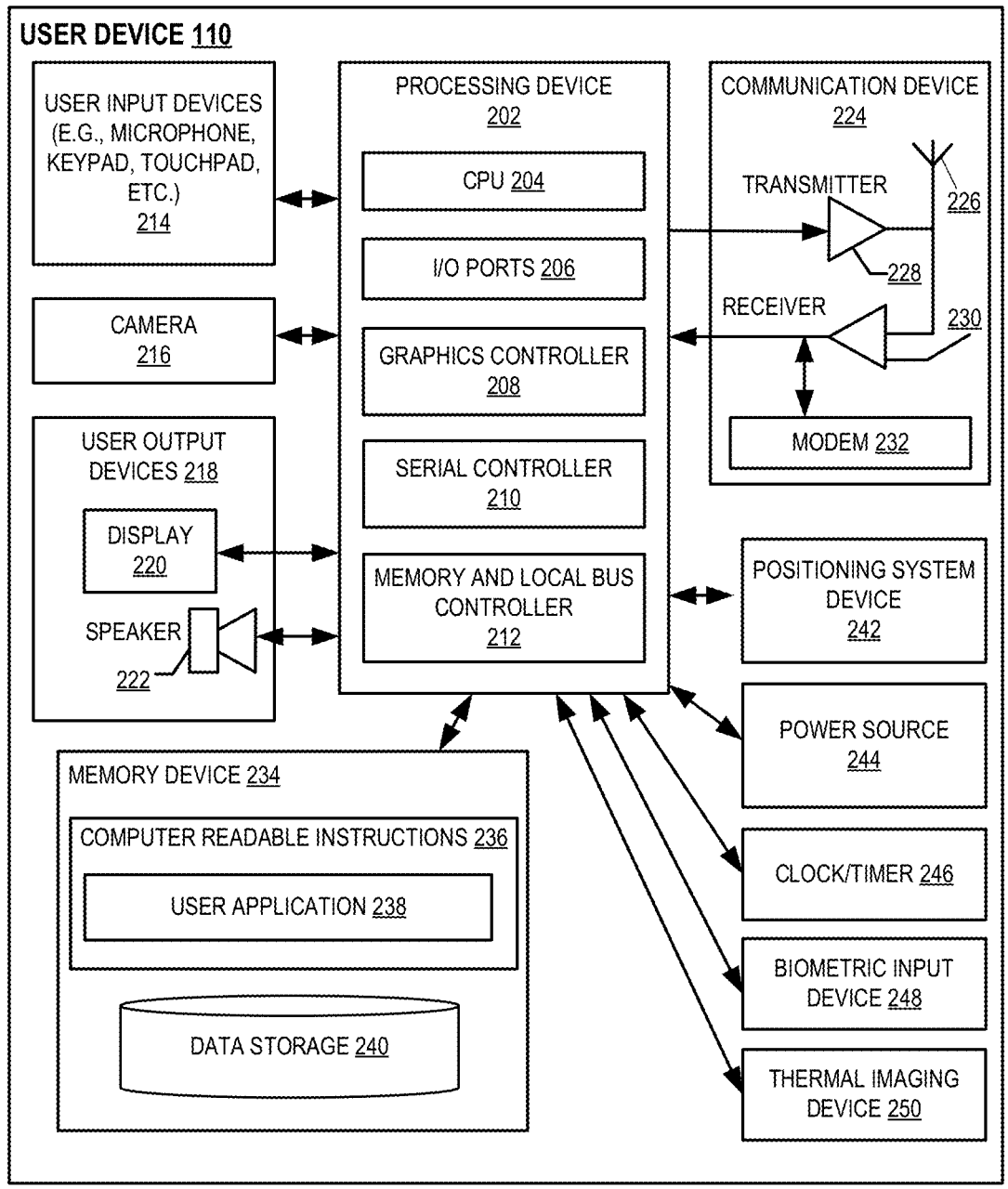
Figure 3:
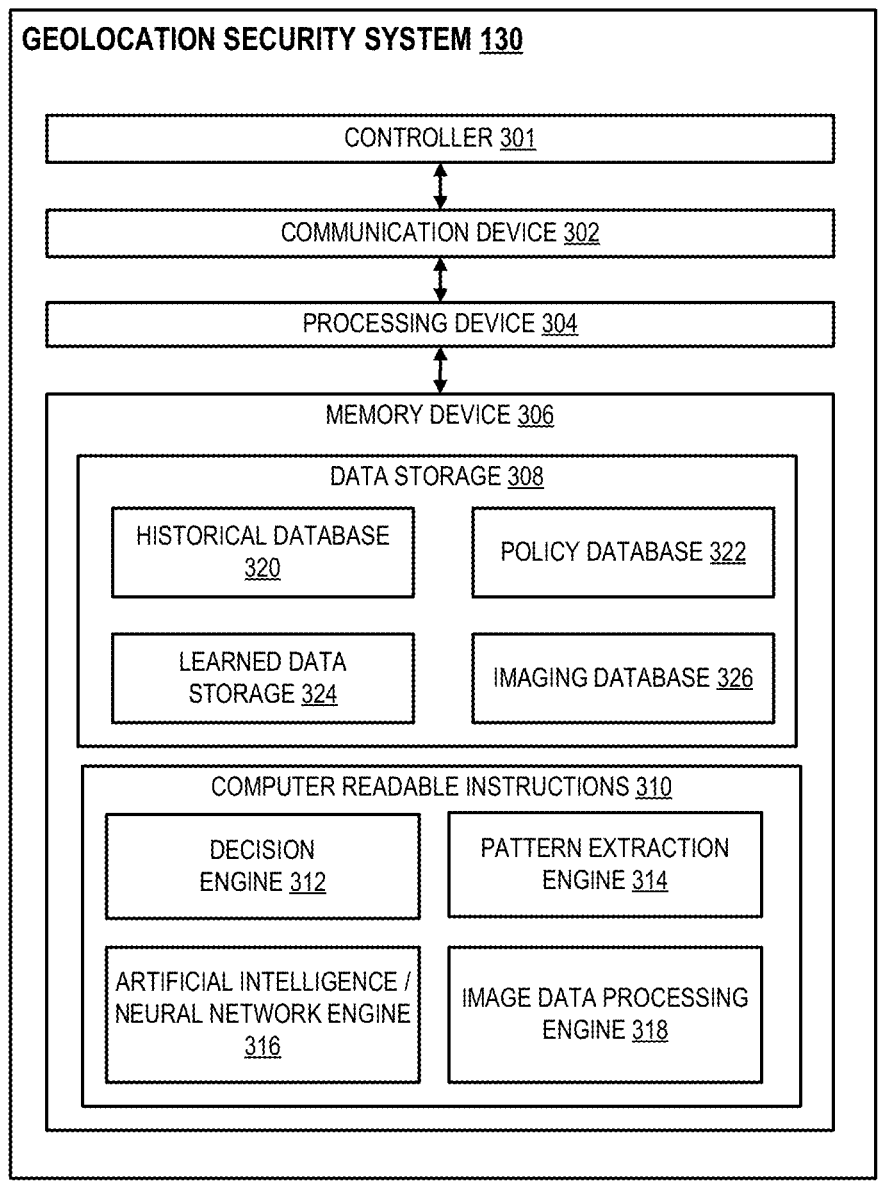
Figure 4:
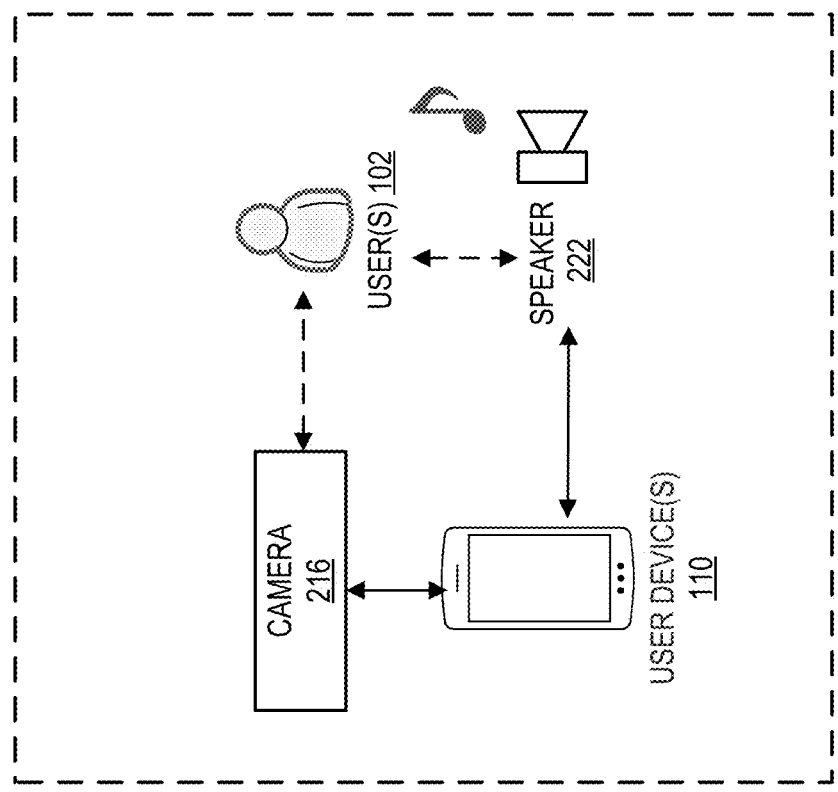
Figure 4:
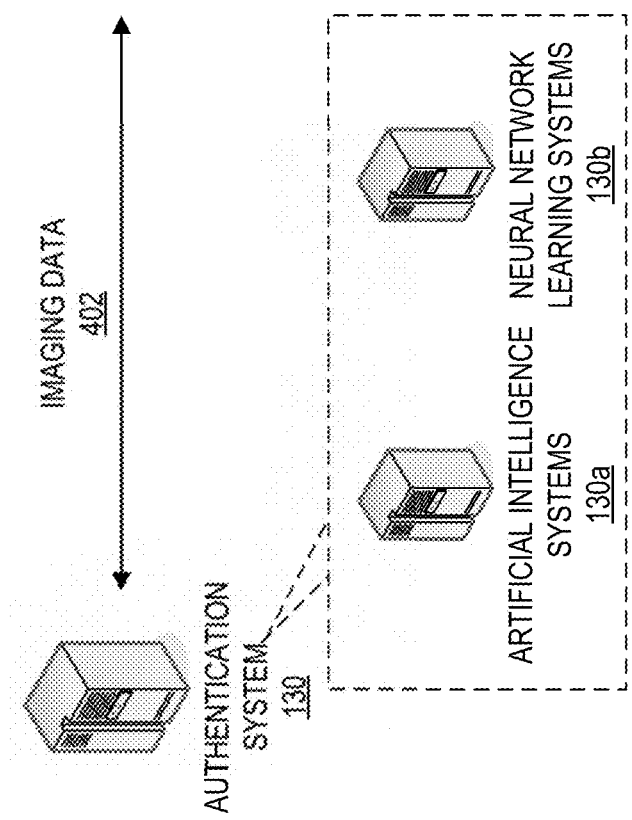
Figure 5:
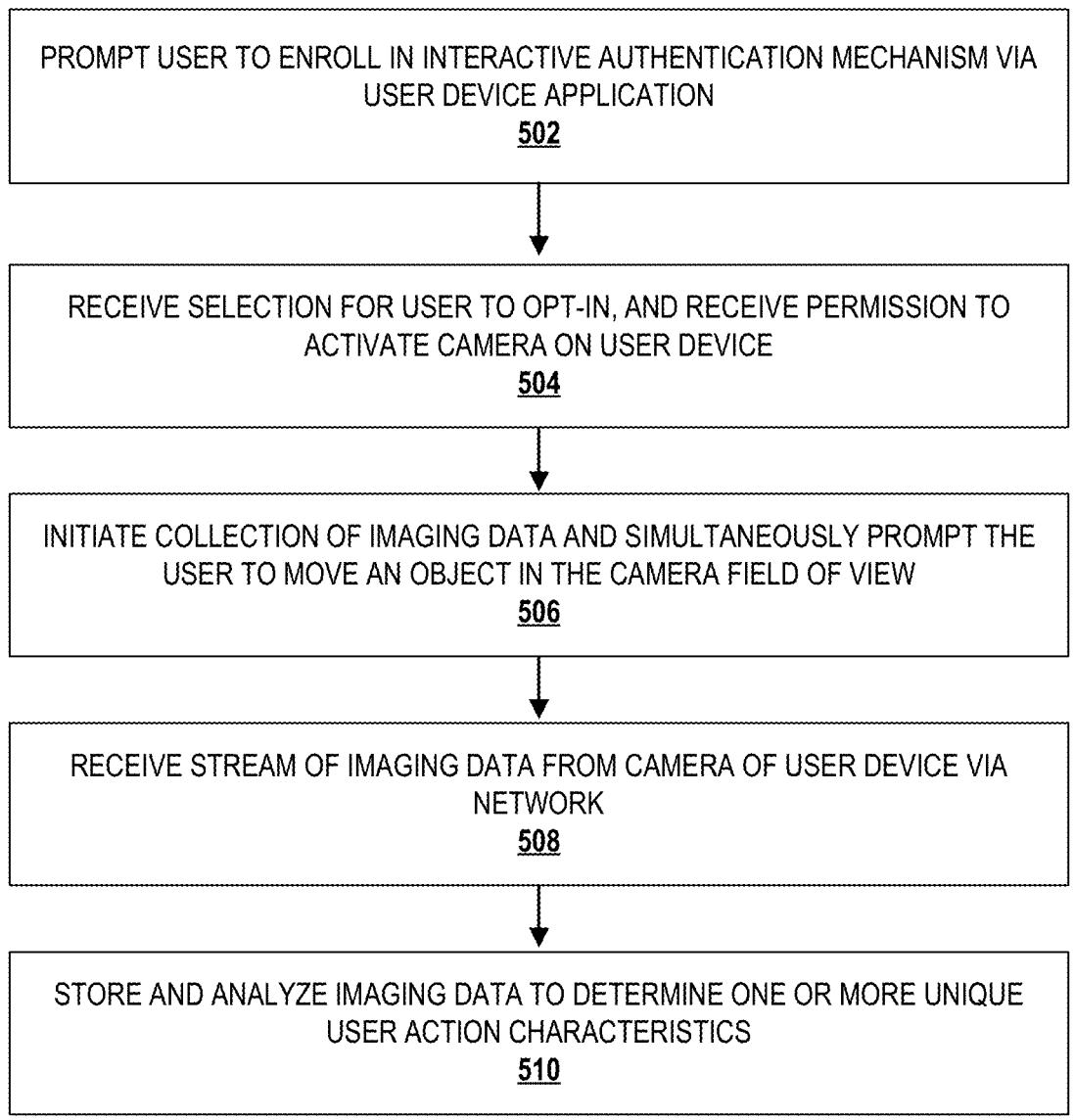

Having thus described embodiments of the invention in general terms, reference will now be made to the accompanying drawings, wherein:

FIG. 1 provides a system environment 100, in accordance with one embodiment of the invention;

FIG. 2 provides a block diagram of a user device 110, in accordance with one embodiment of the invention;

FIG. 3 provides a block diagram of authentication system 130, in accordance with one embodiment of the invention;

FIG. 4 provides a diagram illustrating interaction between authentication system and a user, in accordance with one embodiment of the invention; and FIG. 5 provides a high level process flow for data processing, analysis, and pattern identification, in accordance with one embodiment of the invention.

DETAILED DESCRIPTION OF EMBODIMENTS OF THE INVENTION

Embodiments of the system, as described herein leverage artificial intelligence, machine-learning, and/or other complex, specific-use computer systems to provide a novel approach for geolocation based security utilizing biometric analysis (e.g., facial recognition, or the like), in conjunction with aggregate user and device data for pattern analysis and corroboration for verification purposes. A collaborative system for receiving data and continuously analyzing the data to determine emerging patterns and determine unique measurement baselines based on environmental factors is provided. The system is also designed to detect and analyze data samples as a means of identity verification. In further embodiments, account data and resource transaction data may be collected and compared to user activity data in order to determine statistical likelihood of anomalous circumstances. Common characteristics of data may be used to detect patterns that are broadened in scope and used in a generative neural network approach.

Systems and methods of authentication for high-security applications increasingly rely on the gathering and analysis of biometric data in order to verify user identity. Various implementations exist that employ biometric authentication for a wide array of applications which require a verification of user identity. For instance, secure access to buildings, accounts, devices, user applications, or the like may require biometric authentication in conjunction with or in lieu of conventional passcode based authentication. With the advent of reasonably priced and portable systems and devices which contain high resolution imaging capability, widespread use of biometric authentication has been adopted to provide a secure means of identity verification for a wide range of applications and use-cases. Additionally, the ability for multiple devices to share data over high-speed networks has allowed for remote verification and identity authentication through the use of multiple device systems. In some instances, mobile devices may share data with one or more systems or applications in cases where the user devices have the ability to verify user identity locally and transmit indication of verification to one or more associated systems or third parties.

Biometric authentication mechanisms may, in some instances, use imaging techniques to scan the unique patterns, gradients, and contours in order to create layered 3D maps associated with users' individual physical stature or features. With a high resolution imaging technique, the uniqueness of a user's particular stature or features may provide a low likelihood of a false match under typical circumstances. Additionally, modern network connectivity and data storage capabilities allow for a large amount of aggregate user data and device data to be stored for analysis. In some embodiments, such data may be analyzed in real-time in order to identify emerging patterns or anomalies. For instance, the present invention may utilize the system capabilities and multi-channel data gathering in order to analyze user traffic at a specific location, such as an entity branch location, or the like. By collecting and analyzing user biometric verification data, the systems and methods of the invention described herein may verify that a specific user or users visited a branch location where an account activity occurred (e.g., a resource transaction, deposit, withdrawal, transfer, or the like).

In addition, where specific data on user identify may be unavailable, inaccessible, or blocked for use according to specific user permissions, the system may use an aggregate data method in order to determine a statistical feasibility or likelihood that a certain account activity is authentic or malfeasant. For instance, the system may analyze and record the number of unique users or customers who typically visit a certain branch or entity location during a given time period, and may form a baseline for typical volume of account activity across a given number of accounts during the time period at the entity location. By comparing the frequency or volume of account activity during any given time period to the number of unique users who actually visited or would be expected to visit the entity location during a given time period, the system may determine if the frequency or volume of account activity during the time period is within a statistical normal range or a certain standard of deviation from the baseline. In some embodiments, where the system has identified the frequency or volume of account activity as anomalous, the system may refer to collected user and device activity data for further investigation.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "user" may refer to any entity or individual associated with the system or entity, or whom may be a customer of the system or entity. In some embodiments, a user may be a computing device user, a phone user, a mobile device application user, a customer of an entity or business, a system operator, and/or employee of an entity (e.g., a financial institution). In a specific embodiment, a user may be a managing user of a machine learning model, wherein the system enables the user to reconfigure the model based on user-specified criteria and policies. In another specific embodiment, a user may be a customer accessing a user account via an associated user device, wherein data from an interaction between the user and an entity is analyzed or processed by the system. In some embodiments, identities of an individual may include online handles, account numbers, usernames, identification numbers (e.g., Internet protocol (IP) addresses), aliases, family names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, radio, global positioning system (GPS) devices, portable digital assistants (PDAs), pagers, mobile televisions, or any combination of the aforementioned. The device may be used by the user to access the system directly or through an application, online portal, internet browser, virtual private network, or other connection channel.

As used herein, the term "entity" may be used to include any organization or collection of users that may interact with the geolocation security system. An entity may refer to a business, company, or other organization that either maintains or operates the system or requests use and accesses the system. In one embodiment, the entity may be a software development entity or data management entity. In a specific embodiment, the entity may be a cybersecurity entity or misappropriation prevention entity. In other specific embodiments, the entity may be a "financial institution" or "financial entity" and may include any organization that processes financial transactions including, but not limited to, banks, credit unions, savings and loan associations, investment companies, stock brokerages, insurance companies or the like. In other embodiments, an entity may be a business, organization, a government organization or the like that is not a financial institution. Particularly with respect to the embodiments depicted in FIGS. 1 through 5, the term entity may refer to the entity which manages or administers the development and use of the geolocation security system. As used herein, the term "third party" may be an entity, person, or group, other than the entity that manages the geolocation security system, but may interface with the geolocation security system by providing data, leveraging the capabilities of the geolocation security system, or the like.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, or data archive, wherein the system reaches out to the database and watches, observes, or checks the database for changes, updates, or the like. In other embodiments, a system may passively monitor a database or data stream, wherein the database or data stream provides information to the system and the system then watches, observes, or checks the provided information. In some embodiments, "monitoring" may further comprise analyzing or performing a process on something such as a data source or data stream either passively or in response to an action or change in the data source or data stream. In a specific embodiment, monitoring may comprise continuously monitoring a data stream provided by an imaging device or biometric measurement device in order to analyze changes in the images over time or observe changes in certain objects in different environments.

As used herein, an "interaction," "user action," or "account activity" may refer to any action or communication between users, entities, or institutions, and/or one or more devices or systems within the system environment described herein. For example, an interaction may refer to a user interaction with a system or device, wherein the user interacts with the system or device in a particular way. In one embodiment, interactions may be received or extracted from a data stream (e.g., in real-time). An interaction may include user interactions with a user interface (e.g., clicking, swiping, text or data entry, or the like), authentication actions (e.g., signing-in, username and password entry, PIN entry, or the like), biometric authentication actions (e.g., providing a fingerprint, facial recognition sample, voice sample, movement sample, or the like), account actions (e.g., account access, fund transfers, or the like), or the like. In another example, an interaction may refer to a user communication via one or more channels (i.e., phone, email, text, instant messaging, brick-and-mortar interaction, or the like) with an entity and/or entity system to complete an operation or perform an action with an account associated with user and/or the entity. A subset of interactions may be referred to herein as "resource actions," which refers to any interaction in which the flow of resources or funds to or from a user resource account may occur. In some embodiments, the authentication system 130 may be used to authenticate a resource action (e.g., authenticate the transfer of funds, access to resource account balances, or the like).

FIG. 1 provides a system environment 100, in accordance with one embodiment of the invention. As illustrated in FIG. 1, authentication system 130 is operatively coupled, via a network 101, to the user device(s) 110 (e.g., a mobile phone, computer, laptop, tablet, terminal, automated teller machine or "ATM", wearable device, or the like), third party system 140, and entity system(s) 120. While only one third party system 140 is depicted in the embodiment shown in FIG. 1, it is understood that the network 101 may interconnect authentication system 130, entity system 120, and user device 110 with multiple third party systems 140. In this way, the authentication system 130 can send information to and receive information from the user device 110, the third party system(s) 140, and the entity system 120. In the illustrated embodiment, the plurality of user devices 110 and systems such as entity system 120 and third party system 140 provide a plurality of communication channels through which the entity system 120, third party system 140, and/or the authentication system 130 may communicate over the network 101. In the illustrated embodiment, the authentication system 130 further comprises an artificial intelligence (AI) system 130a and a neural network learning system 130b which may be separate systems operating together with the authentication system 130 or integrated within the authentication system 130.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein. Non-limiting examples of applications in which the system described herein may be incorporated include cybersecurity, misappropriation detection, autonomous device usage or monitoring (e.g., monitoring of intelligent ATM devices, or the like), AI assistants, or the like. In some embodiments, interactions performed between the user device(s) 110 and the third party entity system 120 are intercepted and received by the authentication system 130, wherein interaction data may be extracted from an interaction over the network 101 by the authentication system 130 for analysis. Data monitored and/or extracted by the system may include, in a non-limiting example, user information, communication history, transaction history, or the like. Data, such as user interaction data, may be acquired from across communication channels of an entity such as phone lines, text messaging systems, email, applications (e.g., mobile applications), websites, automated teller machines (ATMs), card readers, call centers, electronic assistants, instant messaging systems, interactive voice response (IVR) systems, brick-and-mortar locations or the like.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual interacting with the entity system 120 via a user device 110 while a data flow or data stream between the user device 110 and the entity system 120 is monitored by or received by the authentication system 130 over the network 101 to be processed or analyzed. In some embodiments a user 102 is a user requesting service from the entity (e.g., customer service) or interacting with an account maintained by the entity system 120 in order to initiate or authenticate a resource action. In an alternative embodiment, the user 102 is a user interacting with, maintaining, or employing the authentication system 130, wherein the system enables the user to reconfigure the model based on user-specified criteria and policies.

In some embodiments, the authentication system 130 receives data from one or more of the user devices 110, entity systems 120, or third party system 140, and analyzes the received data in order to compare user activity with resource account activity. In this way, the authentication system 130 may identify instances where user activity does not match or appears to be in conflict with observed resource account activity or known user patterns. In some embodiments, the system may be programmed to determine a one-to-one match of user identify and resource account transaction occurring at a given location, such that the system reviews resource transactions at a particular entity location, based on data received from entity system 120, and compared this data with biometric data, network data, or other user or user device interaction data received from the entity system 120 in order to verify that an authorized account holder (or owner of the resource account), or account representative (e.g., a co-signor, joint account owner, authorized user, or the like, of the account) was present for the resource transaction.

By virtue of the system's ability intelligently identify a number of unique users and their unique patterns of movement or other identifying characteristics (network activity history, application history, usual schedule of interactions, or the like), the system has the helpful ability to cross reference this data with resource account transaction data in order to make a determination regarding whether the number of transactions or accounts transacted with during a given time period at a given location makes feasible sense given the number of unique users or customers who actually accessed the account.

FIG. 2 provides a block diagram of the user device 110, in accordance with one embodiment of the invention. The user device 110 may generally include a processing device or processor or processing device 202 communicably coupled to devices such as, a memory device 234, user output devices 218 (for example, a user display device 220, or a speaker 222), user input devices 214 (such as a microphone, keypad, touchpad, touch screen, or the like), a communication device or network interface device 224, a power source 244, a clock or other timer 246, a visual capture device such as a camera 216, a positioning system device 242 (e.g., a geo-positioning system device like a GPS device with an included accelerometer, or the like), a biometric input device 248 (e.g., a finger print reader or the like), and a thermal imaging device 250, such as a specialized imaging device that reads and captures thermal characteristics of the surrounding environment and surrounding objects. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems, such as the entity system 120, third party system 140, or authentication system 130. In one embodiment, the user 102 is a maintaining entity of an authentication system 130, wherein the user application enables the user 102 to define policies and reconfigure the authentication system 130. In other embodiments, the user 102 may be a customer of the entity or the third party that is interacting with the authentication system 130 in order to provide authentication data. In one embodiment, the user 102 is a customer of a financial entity and the user application 238 is an online banking application providing access to the entity system 120 wherein the user may interact with a user account via a user interface of the user application 238, wherein the user interactions may be provided in a data stream as an input. In some embodiments, the user 102 may opt in to share data from the user device 110 with the authentication system 130. As such, the user may share various location data, biometric data, or the like, authenticating both the user's identity and location at specific times. Additionally, in some embodiments, the user may opt in to share such data for the purposes of correlation with biometric or identity verification data collected via other devices, such as devices at an entity location (e.g., cameras, infrared scanners, wireless network devices, or the like, located at an entity location, such as a branch location). As such, with the user's permission, the user may opt in to be the subject of pattern recognition and videography action analysis by authentication system 130, as well as anonymized quantitative data sets tracking numerous other user data characteristics to identify unique patterns and trends. The option to opt into such services and capabilities may be provided to the user via a graphical user interface displayed on the user device via the user application 238.

The processing device 202 may be configured to use the communication device 224 to communicate with one or more other devices on a network 101 such as, but not limited to the entity system 120 and the authentication system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network or the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, and/or fourth-generation communication protocols or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance with audio frequency, ultrasound frequency, infrared frequency, or other communication/data networks.

The user device 110 may also include a memory buffer, cache memory or temporary memory device operatively coupled to the processing device 202. Typically, one or more user applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Though not shown in detail, the system further includes one or more entity systems 120 (as illustrated in FIG. 1) which is connected to the user device 110 and the authentication system 130 and which may be associated with one or more entities, institutions, brick and mortar locations, or the like. In this way, while only one entity system 120 is illustrated in FIG. 1, it is understood that multiple networked systems may make up the system environment 100. The entity system 120 generally comprises a communication device, a processing device, and a memory device. The entity system 120 comprises computer-readable instructions stored in the memory device, which in one embodiment includes the computer-readable instructions of an entity application. The entity system 120 may communicate with the user device 110 and the authentication system 130 to provide access to user accounts stored and maintained on the entity system 120. In some embodiments, the entity system 120 may communicate with the authentication system 130 during an interaction with a user 102 in real-time, wherein user interactions or user actions may be monitored and processed by the authentication system 130 in order to analyze interactions with the user 102 and reconfigure the neural network model in response to changes in a received or monitored data stream. In one embodiment, the system is configured to receive data for decisioning, wherein the received data is processed and analyzed by the authentication system 130 to determine a decision for verification of a user identity or the collection and analysis of data regarding the number of unique users visiting a certain location during a given time period.

FIG. 3 provides a block diagram of the authentication system 130, in accordance with one embodiment of the invention. The authentication system 130 generally comprises a controller 301, a communication device 302, a processing device 304, and a memory device 306. As used herein, the term "controller" generally refers to a hardware device and/or software program that controls and manages the various systems described herein such as the user device 110, the entity system 120, and/or the authentication system 130, in order to interface and manage data flow between systems while executing commands to control the systems. In some embodiments, the controller may be integrated into one or more of the systems described herein. In some embodiments, the controller may perform one or more of the processes, actions, or commands described herein.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device. The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the authentication system 130 comprises computer-readable instructions 310 stored in the memory device 306, which in one embodiment includes the computer-readable instructions 310 of a decision engine 312, a pattern extraction engine 314, a pattern extraction engine 314, an artificial intelligence and neural network engine 316, and an image data processing engine 318. In one embodiment, the artificial intelligence and neural network engine 316 may be utilized by the decision engine 312, pattern extraction engine 314, and/or image data processing engine 318 to, respectively, analyze received image data, thermal data, environmental data, and user data in order to identify relevant patterns and user characteristics that can be used to verify user identity or discern between unique users. Even in embodiments where the user's exact identity is not identified, data collected by the authentication system 130 can be used to further correlate or weight toward a determination that a user is who they purport to be. For instance, if the authentication system 130 determines with a 75% confidence that a user's gait, movement, actions, surroundings, or the like match those of a known user, the system may then user other identifying characteristics to determine that the user is who they purport to be during an authentication process (e.g., by using data such as network characteristics, device characteristics, known pattern of device interaction, username and password combination, other biometric indicators, geographic location, or the like).

In some embodiments, the memory device 306 includes data storage 308 for storing data related to the system environment, but not limited to data created and/or used by the decision engine 312, pattern extraction engine 314, image data processing engine 318, and artificial intelligence and neural network engine 316. Storage of data related to the system environment may include various databases such as historical database 320, policy database 322, learned data storage 324, and imaging database 326.

The historical database 320 is used to store information regarding past interactions (e.g., account actions, transactions, communications, inputs) and/or content of a past data stream. In some embodiments, the historical database 320 may be configured to store data from an incoming data stream of images or video data in real-time. In some embodiments, the policy database 322 is configured to store pre-determined policies, conditions, rules, thresholds, user characteristic data, or the like for evaluating and managing the authentication system 130 (e.g., model configurations, user preferences, and model adaptations). The policy database 322 my further be configured to store learned policies, conditions, rules, thresholds, or the like as determined in real-time by the machine learning models of the system described herein. In some embodiments, the policy database 322 is further configured to store metrics, system performance metrics, cost metrics, benefit metrics, cost-change metrics, adversarial scenarios or data, extrapolated scenarios or data, or the like, associated with the authentication system 130. In some embodiments, the policy database 322 and/or the historical database 320 include pre-existing training data for training a machine learning or artificial intelligence engine. In some embodiments, the policy database 322 is configured for storing settings associated with the system itself such as energy efficiency settings, computer resource use efficiency settings, response time settings, regulatory guidelines, or the like.

The learned data storage 324 is configured to store data generated by the system (e.g., via decision engine 312, pattern extraction engine 314, artificial intelligence and neural network engine 316, or the like). The data stored in the learned data storage 324 may be used for training a machine learning model or artificial intelligence engine, and may also be combined with historical data or user interaction data in order to create user characteristic data. The learned data storage 324 may include adversarial or extrapolated scenarios or data generated by the systems described herein which may be fed back into artificial intelligence and neural network learning engines 316 to train the authentication system 130. In some embodiments, the authentication system 130 may include an adversarial function configured for providing adversarial learning and modeling to the system by introducing unreliable or erroneous data to the system; a learning or adaptation function for defining system response to data changes or an adaptation rate for implementing changes (i.e., model reconfiguration) within an architecture of the systems described herein; and an alertness function and robustness function for defining an appropriate system reaction, response, or extent of system reaction based on one or more environmental conditions or previous interactions. In some embodiments, various synthetic data may be injected in an outgoing data stream in real-time and over multiple iterations in order to further aid in identifying environmental patterns by analyzing the various responses received in correspondence to the synthetic data. The artificial intelligence and neural network engines 316 described herein may include engines and/or models directed to, for example, cybersecurity, misappropriation detection, transaction pattern recognition and comparison, statistical anomaly detection, or the like.

The imaging database 326 is configured for storing received or generated image data used by the authentication system 130. The artificial intelligence and neural network engines 316 described herein generate enriched image data that can then be analyzed by the authentication system 130 to determine high-confidence matching of user identities and verification for the completion of one or more user activities, such as the disbursement of resources. It is understood that in some embodiments the identification or matching of user identities may be achieved in an anonymized or genericized fashion. For instance, in some embodiments, the authentication system 130 may not rely on matching a known user or customer with imaging data in order to verify an exact user identity. Rather, the authentication system 130 may simply recognize that image data, network data, device data, or biometric data, may indicate a "user 1" for instance, and may discern that a different set of data signifies a "user 2," and so on. In this way, the authentication system 130 may simply track the number of unique users identified during a given time period. Such generated image data is stored in the imaging database 326, and may be encrypted, genericized, and/or anonymized for added security. In one embodiment, the imaging database 326 is configured to store a collection of image data collected by the entity system 120 or third party systems 140 in order to provide the authentication system 130 with a large amount of image data that allows the authentication system 130 a high level of adaptability to constantly changing environments or a wide array of various environmental conditions and user characteristics, as may be reflected in changes in a received data stream in real time during implementation of the authentication system 130.

In one embodiment of the invention, the authentication system 130 may associate with applications having computer-executable program code that instructs the processing device 304 to perform certain functions described herein. In one embodiment, the computer-executable program code of an application associated with the user device 110 and/or the entity system 120 may also instruct the processing device 304 to perform certain logic, data processing, and data storing functions of the application. In one embodiment, the authentication system 130 further comprises a dynamic optimization algorithm to be executed by the processing device 304 or a controller 301 for reconfiguring a neural network learning model based on, for example, analyzed performance metrics. That said, the algorithm may further include a data pattern of a streamed data source, a data output from one or more models, or the like during an assessment of a new model reconfiguration. In some embodiments, a dynamic optimization algorithm may further receive the data stream and identified changes to the data stream in real-time for determining any reconfigurations.

In non-limiting embodiments, the data stream includes such as system hardware information (e.g., hardware energy usage) or other non-financial authentication information data (e.g., cybersecurity). In still other embodiments, the data stream may contain data collected by a security system for detecting intrusion (e.g., video monitoring, motion detecting, or the like). In other non-limiting examples of data monitored within the data stream include information regarding past, current, or scheduled transactions or other financial data associated with the user. Transaction information may include transaction amounts, payor and/or payee information, transaction dates and times, transaction locations, transaction frequencies, or the like. In some embodiments, data may include information regarding account usage. For example, the data stream may include information regarding usage of a monetary account such as locations or time periods where the account was accessed, or the specific device address or virtual machine identity used in accessing the account. In another example, the data may further include merchants with whom the user frequently interacts, or a service representative whom the user interacted with in the past. In some embodiments, the data stream may contain information regarding characteristics of the data itself which may be monitored by the system. For example, the data stream may contain information regarding the quality of the data (e.g., file size, bit rate of stream), the fidelity of the data (i.e., data accuracy), mutability of the data stream (i.e., how quickly a data pattern in the data stream changes).

The system receives the streaming data where the data is then analyzed and processed by one or more artificial intelligence and neural network engines or models for decisioning purposes. Models, individually and/or structured as clusters, may be trained based on predetermined training data and/or new data acquired in real-time (i.e., from the data stream), wherein the system learns from the data by dynamically identifying patterns as the information is received and processed. In some embodiments of the present invention, models may be adaptive, wherein the models may be reconfigured based on different environmental conditions and/or an analysis and evaluation of the individual model performance. The model may be modified by the system by having one or more individual models and/or clusters added, removed, made inactive, or the like. In another example, the system may weight particular the conclusions of particular models and/or model clusters more than others based on rated accuracy of verification ability. Population architecture refers to a collection and particular arrangement of active models and/or clusters of models that are configured to process information mathematically or computationally to make decisions. Particular models and/or clusters may be weighted by the system to emphasize the impact or contribution of the particular models and/or clusters over others. Embodiments of the authentication system 130 may include multiple systems, servers, computers or the like maintained by one or many entities. In some embodiments, the authentication system 130 may be part of the entity system 120. In other embodiments, the entity system 120 is distinct from the authentication system 130. The authentication system 130 may communicate with the entity system 120 via a secure connection generated for secure encrypted communications between the two systems either over the network 101 or alternative to the network 101.

FIG. 4 provides a diagram illustrating interaction between authentication system and a user, in accordance with one embodiment of the invention. Imaging data 402 received by the authentication system 130 may be provided by a number of sources, including a user device 110, as shown in FIG. 4. In some embodiments, the original image may be captured as part of a biometric authentication process, such as a facial recognition process, and may include an image with one or more layers indicating two-dimensional characteristics of the image perspective, three dimensional characteristics of object contours, or the like. In other embodiments, the image data 402 may be a stream of data, such as a video stream, as well as associated audio data. In other embodiments, the image data 402 may contain or be overlaid with infrared image data captured and mapped as a layer to the original image or video stream in order to determine contours within the image data 402. As such image data 402 may contain a relative measurement of infrared data as measurement varies across an object surface, such as some portion of the user 102, or an object that the user may be holding or manipulating in from of the camera 216. Infrared data may be particularly useful in instances where the user or an object that the user is holding is not particularly well-lit, and thus not discernable by a conventional device camera. Additionally, a speaker 222 of the user device 110 may be used to emit a sound, frequency, song, melody, tone, series of tones, or the like, in order to compare the user 102's movements to a known tempo, beat, time signature or the like. In this way, the authentication system 130 may utilize the AI systems 130a and neural network learning systems 130b in order to determine unique user patterns associated with their movement.

For instance, the system may prompt the user 102, via the user device 110, to opt in to an intelligent "multifactor authentication dance" option, wherein the user may select a song, and present an object in front of the camera 216 to provide unique movement data to authentication system 130. The user may manipulate any object, such as a figurine, toy, pen, office supply, or anything else within the perspective view of camera 216, and may dance the object across the field of view for a set period of time. By recording and analyzing the resultant imaging data 402, the authentication system 130 may identify one or more unique movements or segments of a video stream which might be later compared to further imaging data 402 to determine any similarities. In this way, the user's movements, while not necessarily identical during each authentication session, may provide the authentication system 130 with additional data points to make a weighted determination as to the veracity of the user's authentication attempt to access an entity application, resource account, online account, device function, or the like. As a result, the authentication system 130 essentially prompts the user to provide user action data to the system via a fun, interactive manner, which can then be used to determine unique user characteristics such as gait, rhythm of movement, song preference, object preference, or the like. As previously mentioned, this data may be combined with other data such as device characteristics, network characteristics, geolocation, biometric information, username and password information, or the like, in order to determine a combined weighted authentication score. The system may employ the use of a threshold to determine if the user can be verified. In some embodiments, the determination may be based on a number of factors (e.g., a user who may be identified according to imaging data 402, device characteristics, and network characteristics may be authenticated on a combined weighted confidence score of 95%, while a username and password combination would require 100% accuracy). In this way, the system may conduct MFA techniques in a more interactive and seamless manner as compared to conventional systems.

FIG. 5 provides a high level process flow for data processing, analysis, and pattern identification, in accordance with one embodiment of the invention. As shown in block 502, the process begins by prompting a user to enroll in an interactive authentication mechanism via a user device application, web portal, or the like. For instance, the first component of the system may involve a user registration element. In this component, users can navigate to a web interface, establish identity through existing authentication mechanisms, and then enroll in an "enhanced MFA dance party solution," or the like. The user may make a selection to opt-in, and the system receives the selection for the user opt-in. The system may also contemporaneously or additionally receive permission to activate or control a camera or video camera of the user device, as shown in block 504. As such, enrollment procedures may involve turning on, or giving access for the system to activate, a camera, webcam, or the like.

After the user has opted into the interactive authentication mechanism via the user device application, the system may initiate collection of imaging data, and may, in some embodiments, simultaneously prompt the user to move an object in a field of view of the camera, as shown in block 506. As indicated in block 508, the system may then receive a stream of imaging data from the user device over a network. The user may be prompted to continue holding up an object of choice while the camera takes multiple images of the selected object in order to determine a three-dimensional (3D) mapping of the object contours. Once the system has captured enough imaging data for the object in order to render a 3D image, the system will ask the user to hold it in a preferred way, as determined by the user. The system will capture imaging data of the user holding the object from multiple angles and store these alongside the 3D rendering. This information may be stored and analyzed to determine one or more unique user action characteristics corresponding to the user, which can then be later utilized to authenticate the user's identity.

The system may prompt the user to "dance" the object from one side of the camera's field of view to the other side. Some implementations may also include a music selection option. When the user is dancing the object, the camera will record imaging data of the movement of the object, and track gait analysis metrics for the dancing object. This dancing may occur multiple times, depending on the recorded movement and gait analysis algorithm being employed. The authentication system 130 receives or records imaging data, device data, and transaction data. It is understood that in some embodiments, the authentication system 130 itself may record such data via the use of cameras, sensors, or the like, and store this data in an imaging database 326 or historical database 320 for later review. The authentication system 130 may also include learned data storage 324, as discussed in FIG. 3, which may contain relevant pattern and recognition data helpful in analyzing gathered image data and gait metrics. In some embodiments, the authentication system 130 may also receive data from one or more entity system(s) 120 or user device(s) 110, such as transaction data, location data, authentication data, biometric data, temporal data, image data, music data, or the like.

The authentication system 130 analyzes and compares the received or recorded image data and device data in order to determine a number of unique users from the available recorded or received data. For instance, the authentication system 130 may employ the various processing and recognition steps in order to analyze image or infrared data in order to determine first if one or more human facial patterns exists in the recorded or received image data, secondly if a facial pattern represents an authentic human user, and thirdly to map the contours of any objects within the camera or sensor's field of view. In some embodiments, the authentication system 130 may further determine the human user's unique identity based on historical data or by corroborating the data with other data, such as device data. In some embodiments, the system may only identify that the user is a unique, authentic, human user in order to tally the number of unique users identifiable from the available recorded or received data.

It is understood that an additional component of the authentication system 130 may be an API that enables other systems, such as third party system(s) 140, to request an authentication transaction from the use of the enhanced MFA dance party solution. This allows other systems to make use of the enhanced MFA dance party solution in high value authentication transactions, or simply as an enterprise sees fit. An additional component of the authentication system 130 may include a dashboard and reporting module which indicates metrics and volumes such as historical usage, authenticated transactions, failed or unsuccessful transactions, or the like. In order to protect the integrity of the system and collected user data, any and all data relating to one or more users may be stored in a hashed encryption database with integrity checking mechanisms and associated signature files for additional configuration preservation and user matching.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with collaborative machine learning and population reconfiguration.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for state-based learning and neural network reconfiguration, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for user authentication via object movement recognition, the system comprising:
a module containing a memory storage device, a communication device, and a processor, with computer-readable program code stored thereon, wherein executing the computer-readable code is configured to cause the processor to:
transmit a prompt to a user device, wherein the prompt requests a user response to opt-in to an interactive authentication mechanism;
receive a selection to opt-in from the user device;
transmit instruction to the user device to initiate collection of imaging data via an image sensor of the user device;
receive a stream of imaging data from the user device over a network;
conduct an image analysis of an object identified in the imaging data in order to determine unique user action characteristics, wherein the unique user action characteristics include predefined object movement patterns that are analyzed in real-time using machine learning algorithms, and wherein analysis further comprises comparing the predefined object movement patterns to a database of known patterns to authenticate a user;
utilize at least one of an infrared sensor or accelerometer to collect data three-dimensional movement data;
collect data from multiple channels, comprising video, audio, and infrared data streams; and
integrate with third-party systems via application programming interface (API) access to provide multi-factor authentication using the predefined object movement patterns.

2. The system of claim 1, wherein the selection to opt-in further comprises an authorization to access or activate the image sensor of the user device.

3. The system of claim 1, further comprising transmitting instructions to the user device to display an option to select one or more songs for playback during the stream of imaging data.

4. The system of claim 1, further comprising a use of infrared image sensing via the user device to render a three-dimensional map of one or more features of the user or a contour map of one or more objects.

5. The system of claim 1, further comprising providing API access to one or more third party systems, wherein the API access allows the one or more third party systems to authenticate the user via object movement recognition.

6. The system of claim 1, further comprising causing the user device to display a dashboard and reporting module, wherein the dashboard and reporting module indicates one or more metrics and volumes such as historical usage, authenticated transactions, or failed transactions.

7. A computer-implemented method providing user authentication via object movement recognition, the computer-implemented method comprising:
transmitting a prompt to a user device, wherein the prompt requests a user response to opt-in to an interactive authentication mechanism;
receiving a selection to opt-in from the user device;
transmitting instruction to the user device to initiate collection of imaging data via an image sensor of the user device;
receiving a stream of imaging data from the user device over a network;

conducting an image analysis of an object identified in the imaging data in order to determine unique user action characteristics, wherein the unique user action characteristics include predefined object movement patterns that are analyzed in real-time using machine learning algorithms, and wherein analysis further comprises comparing the predefined object movement patterns to a database of known patterns to authenticate a user;

utilizing at least one of an infrared sensor or accelerometer to collect data three-dimensional movement data;

collecting data from multiple channels, comprising video, audio, and infrared data streams; and integrating with third-party systems via application programming interface (API) access to provide multifactor authentication using the predefined object movement patterns.

8. The computer-implemented method of claim 7, wherein the selection to opt-in further comprises an authorization to access or activate the image sensor of the user device.

9. The computer-implemented method of claim 7, further comprising transmitting instructions to the user device to display an option to select one or more songs for playback during the stream of imaging data.

10. The computer-implemented method of claim 7, further comprising a use of infrared image sensing via the user device to render a three-dimensional map of one or more features of the user or a contour map of one or more objects.

11. The computer-implemented method of claim 7, further comprising providing API access to one or more third party systems, wherein the API access allows the one or more third party systems to authenticate the user via object movement recognition.

12. The computer-implemented method of claim 7, further comprising causing the user device to display a dashboard and reporting module, wherein the dashboard and reporting module indicates one or more metrics and volumes such as historical usage, authenticated transactions, or failed transactions.

13. A computer program product providing user authentication via object movement recognition, the computer program product comprising at least one non-transitory computer-readable medium having computer-readable program code portions embodied therein, the computer-readable program code portions comprising:

an executable portion configured for transmitting a prompt to a user device, wherein the prompt requests a user response to opt-in to an interactive authentication mechanism;

an executable portion configured for receiving a selection to opt-in from the user device;

an executable portion configured for transmitting instruction to the user device to initiate collection of imaging data via an image sensor of the user device;

an executable portion configured for receiving a stream of imaging data from the user device over a network; and an executable portion configured for conducting an image analysis of an object identified in the imaging data in order to determine unique user action characteristics, wherein the unique user action characteristics include predefined object movement patterns that are analyzed in real-time using machine learning algorithms, and wherein analysis further comprises comparing the predefined object movement patterns to a database of known patterns to authenticate a user;

an executable portion configured for utilizing at least one of an infrared sensor or accelerometer to collect data three-dimensional movement data;

an executable portion configured for collecting data from multiple channels, comprising video, audio, and infrared data streams; and an executable portion configured for integrating with third-party systems via application programming interface (API) access to provide multifactor authentication using the predefined object movement patterns.

14. The computer program product of claim 13, wherein the selection to opt-in further comprises an authorization to access or activate the image sensor of the user device.

15. The computer program product of claim 13, further comprising transmitting instructions to the user device to display an option to select one or more songs for playback during the stream of imaging data.

16. The computer program product of claim 13, further comprising a use of infrared image sensing via the user device to render a three-dimensional map of one or more features of the user or a contour map of one or more objects.

17. The computer program product of claim 13, further comprising providing API access to one or more third party systems, wherein the API access allows the one or more third party systems to authenticate the user via object movement recognition.

* * * * *